(12) United States Patent
Nagarajan et al.

(10) Patent No.: US 11,689,445 B2
(45) Date of Patent: *Jun. 27, 2023

(54) DYNAMIC LOW LATENCY ROUTING

(71) Applicant: ARRIS Enterprises LLC, Suwanee, GA (US)

(72) Inventors: Sabarinathan Nagarajan, Karnataka (IN); Lakshmi Arunkumar, Karnataka (IN); Ian G. Wheelock, Cork (IE)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,671

(22) Filed: Nov. 18, 2021

(65) Prior Publication Data

US 2022/0200899 A1    Jun. 23, 2022

Related U.S. Application Data

(60) Provisional application No. 63/127,248, filed on Dec. 18, 2020.

(51) Int. Cl.
*H04L 45/121* (2022.01)
*H04L 45/12* (2022.01)
(Continued)

(52) U.S. Cl.
CPC .......... *H04L 45/121* (2013.01); *H04L 45/123* (2013.01); *H04L 45/22* (2013.01);
(Continued)

(58) Field of Classification Search
CPC ..... H04L 45/121; H04L 45/123; H04L 45/22; H04L 45/38; H04L 47/24; H04L 47/2483
See application file for complete search history.

(56) References Cited

U.S. PATENT DOCUMENTS 9,929,961 B2 *   3/2018  Luke ................... H04L 45/38
11,050,668 B2 *  6/2021  Luke ................. H04L 45/7453
(Continued)

OTHER PUBLICATIONS

Greg White et al. "Low Latency DOCSIS: Overview and Performance Characteristics", 2019 SCTE ISBE Cable-Tec Expo, New Orleans, LA, USA, 27 pages. (Year: 2019).*
(Continued)

*Primary Examiner* — George C Neurauter, Jr.
(74) *Attorney, Agent, or Firm* — Wenderoth, Lind & Ponack, L.L.P.

(57) ABSTRACT

An optimizing agent of a network device that does not support low latency DOCSIS can identify traffic or packets associated with a client resource for an optimization service flow. For example, the optimizing agent can receive a priority notification associated with a client resource from a low latency controller that is indicative of a low latency requirement associated with the client resource. The optimizing agent identifies the traffic for the optimized service flow based on the priority notification. The identifying can require modifying one or more parameters of an existing service flow, creating a new service flow, or selecting an existing service flow with low latency. The identified traffic can be routed to the optimized service flow to achieve low latency or high QoS.

20 Claims, 5 Drawing Sheets

(51) Int. Cl.
*H04L 45/00* (2022.01)
*H04L 47/2483* (2022.01)
*H04L 47/24* (2022.01)

(52) U.S. Cl.
CPC .............. *H04L 45/38* (2013.01); *H04L 47/24* (2013.01); *H04L 47/2483* (2013.01)

(56) References Cited

U.S. PATENT DOCUMENTS

| | | | |
|---|---|---|---|
| 2005/0018651 A1 | 1/2005 | Yan et al. | |
| 2018/0343206 A1* | 11/2018 | White | H04L 47/11 |
| 2020/0053018 A1* | 2/2020 | White | H04L 47/11 |
| 2021/0029049 A1* | 1/2021 | Assouline | H04L 67/61 |

OTHER PUBLICATIONS

International Search Report and the Written Opinion of the International Searching Authority dated Mar. 2, 2022 in International (PCT) Application No. PCT/US2021/059823.

White K Sundaresan B Briscoe Cablelabs G: "Low Latency DOCSIS—Technology Overview; draft-white-tsvwg-lld-OO.txt", Low Latency Docsis—Technology Overview; Draft-White-Tsvwg-LLD-00 . Txt; Internet-Draft: Transport Area Working Group, Internet Engineering Task Force, IETF; Standardworkingdraft, Internet Society (ISO, Mar. 12, 2019 (Mar. 12, 2019), pp. 1-25, XP015132011, Retrieved from the Internet: URL:https://tools.ietf.org/html/draft-white-tsvwg-lld-00 [retrieved on Mar. 12, 2019] Section 2 Latency in DOCSIS Networks; Section 3 New Dual-Queue Approach;; p. 4-p. 12 Section 6 Deployment Considerations; p. 16-p. 18.

DVB Organization: "ANSI_SCTE 169-1 2010 .pdf", DVB, Digital Video Broadcasting, C/O EBU—17A Ancienne Route—CH-1218 Grand Saconnex, Geneva—Switzerland, Apr. 25, 2016 (Apr. 25, 2016), XP017850983, p. 5-p. 20; figure 1.

"Data-Over-Cable Service Interface Specifications DOCSIS 4.0 MAC and Upper Layer Protocols Interface Specification", ITU-T Draft; Study Period 2017-2020; Study Group 9, International Telecommunication Union, Geneva ; CH Feb. 17, 2020 (Feb. 17, 2020), pp. 1-953, XP044289244, Retrieved from the Internet: URL:https://www.itu.int/ifa/t/2017/sg9/docs/c/ties/T17-SG09-C-0112! !ZIP-E.zip DOCSIS%204.0/CM-SP MULPIv4.0-I01-190815.pdf [retrieved on Feb. 17, 2020] Section 7.5.7 General Operation (Static / dynamic configuration operation);; p. 290-p. 292 Section 7.7 Low Latency Support; p. 298-p. 315 Section 11.2 Dynamic Service Flow Changes (CM initiated / CMTS initiated);; p. 502-p. 534.

* cited by examiner

DYNAMIC LOW LATENCY ROUTING

BACKGROUND

Cable service providers, which are also referred to as Multiple System Operators ("MSO"), typically transmit analog and digital video broadcast television signals, as well as broadband data services, to their customers. These broadband data services typically include Internet access using the Data Over Cable Service Interface Specification ("DOCSIS") protocol. The Low Latency DOCSIS (LLD) technology aims to achieve an approximately one millisecond round-trip delay for time sensitive applications, for example, online gaming applications. An aggregate service flow (ASF) is created to establish service flows (SF) in each direction with one flow to carry non-queue binding (NQB) traffic, such as LLD traffic, and another flow to carry queue building (QB) traffic, such as traffic associated with video streaming. Network environments increasingly include various devices connected to the network. Some of these devices or the applications running on these devices generally do not require low latency or any prioritization. However, certain critical or high priority situations can occur that require traffic associated with the device or application be serviced with the lowest possible latency on the network. Thus, there is a need to create or provide a low latency service flow to service this traffic when such critical or high priority situations occur.

SUMMARY

As described herein is a network and method for identifying and routing low latency traffic associated with a client resource, such as a low latency application, for or to a low latency service flow based on a prioritization notification. For example, a network environment can include a network device that comprises an optimizing agent and a client device connected to the network device. The client device can be connected to a client resource (for example, an Internet of Things (IoT) device) or can comprise a client resource (for example, an application). One or more events can occur that trigger an action such that traffic associated with the client resource requires low latency or prioritization to ensure proper operation or functioning of the client resource or an associated client device. A low latency controller can receive a message or data associated with the requirements of the client resource based on the action and send a prioritization notification to the low latency controller. The low latency controller can use this information for a prioritization notification that is sent to the network device so that the traffic associated with the client resource can be identified for a low latency service flow and/or routed to a low latency service flow. In this way, the existing network infrastructure can be utilized to identify low latency traffic for an optimized service flow so as to ensure the low latency required by a client resource. A higher level of quality of service (QoS) can be provided without requiring extensive costs or personnel resources.

An aspect of the present disclosure provides a method for an optimizing agent of a network device to identify client resource traffic associated with a client resource for an optimized service flow. The method comprises establishing a connection to a low latency controller and one or more client devices, wherein the client resource is associated with at least one of the one or more client devices, receiving a priority notification associated with the client resource from the low latency controller, wherein the priority notification is based on data from the at least one of the one or more client devices, and wherein the priority notification is indicative of a low latency requirement associated with the client resource, and identifying the client resource traffic for the optimized service flow, wherein identifying the client resource traffic on the optimized service flow comprises one of modifying one or more parameters of the optimized service flow, wherein the optimized service flow is one of the one or more existing service flows, creating a new service flow as the optimized service flow, or selecting a low latency service flow from the one or more existing service flows on which low latency packets are currently routed as the optimized service flow based on an usage factor associated with the low latency service flow.

In an aspect of the present disclosure, the method comprises receiving an action message from the at least one of the one or more client devices, wherein the action message is based on the data from the at least one of the one or more client devices, sending the action message to the low latency controller using an existing service flow of the one or more existing service flows, and wherein the priority notification is based on the action message.

In an aspect of the present disclosure, the method further comprises receiving, from the low latency controller, a client resource message associated with the client resource, wherein the client resource message is based on the action message and routing the client resource message to the client resource over the optimized service flow.

In an aspect of the present disclosure, the method wherein the client resource is an Internet of Things (IoT) device, a local IoT controller is connected between the network device and the client resource, and the routing the client resource message to the client resource comprises routing the client resource message to the local IoT controller.

In an aspect of the present disclosure, the method wherein selecting the low latency service flow comprises determining one or more traffic class attributes associated with the low latency service flow, selecting a traffic class associated with the low latency service flow based on the one or more traffic class attributes, determining a usage factor associated with the low latency service flow, routing the client resource traffic to the low latency service flow based on the traffic class and the usage factor.

In an aspect of the present disclosure, the method wherein the priority notification is also indicative of a low latency requirement associated with the at least one of the one or more client devices such that client device traffic associated with the at least one of the one or more client devices is also identified for the optimized service flow.

In an aspect of the present disclosure, the method further comprising determining a cessation of client device traffic associated with the at least one of the one or more client devices; and altering the optimized service flow based on the cessation of the client device traffic, wherein altering the optimized service flow comprises one of reverting the modification of the one or more parameters, deleting the new service flow, or ceasing routing of the client resource traffic on the optimized service flow.

An aspect of the present disclosure provides an optimizing agent of a network device for identifying client resource traffic associated with a client resource for an optimized service flow. The network device comprises a memory storing one or more computer-readable instructions and a processor configured to execute the one or more computer-readable instructions to establish a connection to a low latency controller and one or more client devices, wherein the client resource is associated with at least one of the one or more client devices, receive a priority notification associated with the client resource from the low latency controller, wherein the priority notification is based on data from the at least one of the one or more client devices, and wherein the priority notification is indicative of a low latency requirement associated with the client resource, and identify the client resource traffic for the optimized service flow, wherein identifying the client resource traffic on the optimized service flow comprises one of modifying one or more parameters of the optimized service flow, wherein the optimized service flow is one of the one or more existing service flows, creating a new service flow as the optimized service flow, or selecting a low latency service flow from the one or more existing service flows on which low latency packets are currently routed as the optimized service flow based on an usage factor associated with the low latency service flow.

In an aspect of the present disclosure, the processor is configured to execute one or more further instructions to receive an action message from the at least one of the one or more client devices, wherein the action message is based on the data from the at least one of the one or more client devices, send the action message to the low latency controller using an existing service flow of the one or more existing service flows, and wherein the priority notification is based on the action message.

In an aspect of the present disclosure, the processor is configured to execute one or more further instructions to receive, from the low latency controller, a client resource message associated with the client resource, wherein the client resource message is based on the action message and route the client resource message to the client resource over the optimized service flow.

In an aspect of the present disclosure, the client resource is an Internet of Things (IoT) device, a local IoT controller is connected between the network device and the client resource, and the routing the client resource message to the client resource comprises routing the client resource message to the local IoT controller.

In an aspect of the present disclosure, wherein selecting the low latency service flow comprises determining one or more traffic class attributes associated with the low latency service flow, selecting a traffic class associated with the low latency service flow based on the one or more traffic class attributes, determining a usage factor associated with the low latency service flow and routing the client resource traffic to the low latency service flow based on the traffic class and the usage factor.

In an aspect of the present disclosure, the priority notification is also indicative of a low latency requirement associated with the at least one of the one or more client devices such that client device traffic associated with the at least one of the one or more client devices is also identified for the optimized service flow.

In an aspect of the present disclosure, the processor is configured to execute one or more further instructions to determine a cessation of client device traffic associated with the at least one of the one or more client devices and alter the optimized service flow based on the cessation of the client device traffic, wherein altering the optimized service flow comprises one of reverting the modification of the one or more parameters, deleting the new service flow, or ceasing routing of the client resource traffic on the optimized service flow.

An aspect of the present disclosure provides a non-transitory computer-readable medium of storing one or more instructions for identifying traffic associated with a client resource for an optimized service flow, which when executed by a processor of a network device of a network, cause the network device to perform one or more operations to perform any one or more of the above method steps.

The above-described network device(s) or electronic apparatus(es), such as access point devices, extender access point devices, client devices and any other network devices, may be implemented as any of a residential network access point device, an electronic device (for example, a mobile phone, a computing device such as a notebook computer, or both) according to one or more embodiments.

Thus, according to various aspects of the present disclosure described herein, it is possible to identify traffic for a specific application and/or a client device for an optimized service flow so as to provide a higher level of QoS such that a user has an enhanced or improved network experience.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
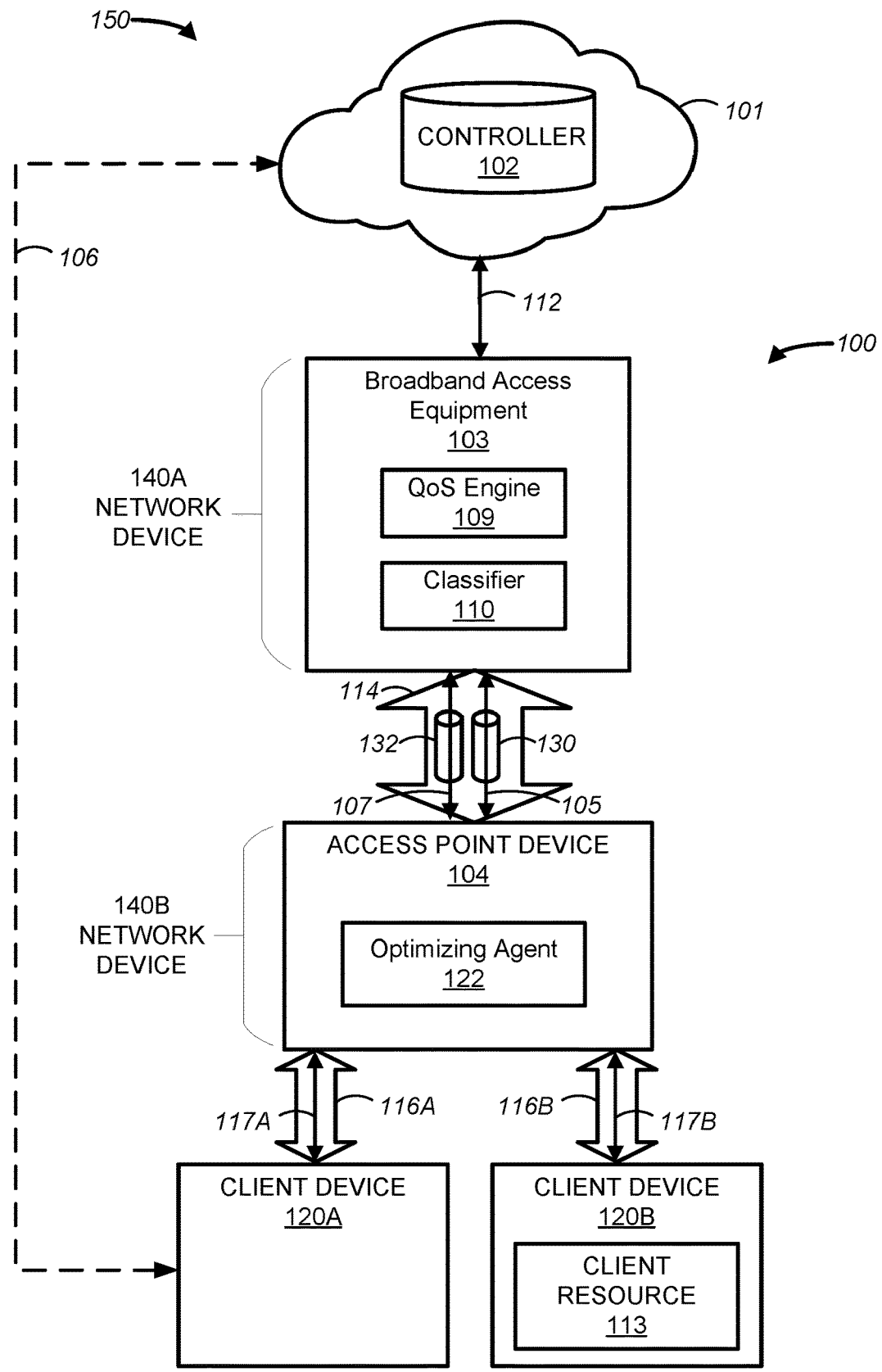
FIG. 1 is an illustration of a network environment that provides an optimized service flow for low latency traffic, according to one or more aspects of the present disclosure.

Referring now to FIG. 1, the figure illustrates a network environment 150 that provides or identifies in a network 100 low latency traffic 117 associated with a client resource 113, such as an application of a client device 120, for a service flow that provides low latency. The network 100 is connected to a network resource 101 in the network environment 150 via a connection 112. In one or more embodiments, the network 100 can include an Internet Service Provider (ISP). The ISP can comprise any of the broadband access equipment 103, the network resource 101, the low latency controller 102, or any combination thereof.

The network resource 101 can include a low latency controller 102 that provides information associated with one or more requirements for low latency within the network 100, for example, one or more low latency parameters or requirements for traffic 117, such as traffic 117A and/or 117B) associated with a client resource 113. For example, the one or more low latency parameters can comprise any of a maximum sustained traffic rate (such as US TLV [24/70/93].8 or DS TLV [25/71/94].8), a maximum traffic burst (such as [24/25/70/71/93/94].9), a peak traffic rate (such as US TLV [24/70].27 & DS TLV [25/71].27), any other low latency parameter, or a combination thereof. The network resource 101, the low latency controller 102, or both can comprise a representative computer system 200 as discussed with reference to FIG. 2. In one or more embodiments, the network resource 101 can be an Internet cloud resource or a cloud-based service, a cloud-based repository, any other type of cloud or network resource, or any combination thereof. The connection 112 between the network resource 101 and the broadband access equipment 103 can be implemented using a DOCSIS network, an Internet engineering task force (IETF) standards-based network, or any other appropriate network.

In one or more embodiments, the network 100 can comprise one or more network devices 140, for example, network device 140A and network device 140B. The network device 140A can be a broadband access equipment 103. The broadband access equipment 103 can be connected to the network resource 101 via a connection 112. In one or more embodiments, connection 112 can include a Commercial Grade Network Address Translation ("CGNAT") device. Connection 112 provides for transmitting and receiving data to and from the broadband access equipment 103.

In one or more embodiments, the broadband access equipment 103 can be any of a cable modem termination system (CMTS), an optical line terminator (OLT), a broadband network gateway (BNG), a digital subscriber line access multiplexer (DSLAM), or any combination thereof. The broadband access equipment 103 can include a QoS engine 109 and a classifier 110. The QoS engine 109 and classifier 110 can include information relating to the Media Access Control ("MAC") address of an access point device 104; a primary quality of service, such as Pri_SF=1 megabits per second (Mbps); a secondary quality of service, such as Sec_SF=40 Mbps; and can classify the WAN IP address of an access point device 104. The broadband access equipment 103 can transmit and receive data to and from an access point device 104 via a connection 114. To expose the QoS of the devices in the network 100 to the broadband access equipment 103, classifiers are added to the Sec_SF information, based on the TCP/UDP port range 0-16k, where "k" represents 1024. To provide extra service to the network 100, it may also be desirable to split the network address port translation (NAT) transmission control protocol/user datagram protocol (TCP/UDP) port space using the range 0-16k for specific addresses in the network 100, and using the range 16k (or 16,384) to 64k (or 65536) for all other internet protocol (IP) addresses. The assignment of traffic in the network 100 to the NAT TCP/UDP port ranges can be based on multiple traffic classifiers if required. For instance, a simple option is to assign an explicit IP address to use the reserved TCP/UDP port range, thus ensuring that all traffic for a specific device, for example, a client device 120 (such as client device 120A and/or client device 120B), in the home network would get differentiated QoS. Another approach could be to use specific differentiated services code point (DSCP) markings in packets to use the reserved TCP/UDP port range. Multiple TCP/UDP port ranges could also be identified to enable multiple QoS levels to be supported by the broadband access equipment 103. In terms of being able to classify traffic to identify if a client resource 113 requires higher QoS, then this is preferably achieved through a user interface that is exposed to a user to pick out priorities for different client resources 113. Alternatively, it could be offered through service provider policies, e.g., ensuring World of Warcraft games or emergency alert devices get a high QoS.

The network 100 can include one or more access point devices 104. In one or more embodiments, the access point device 104 does not include LLD support. An access point device 104 can be an electronic device that does not support LLD. In one or more embodiments, the access point device 104 does include LLD support. For example, the access point device 104 can be configured as a DOCSIS 3.0 device or a DOCSIS 3.1 device running a stack that does not support LLD. While only one access point device 104 is illustrated, the present disclosure contemplates any number access point devices 104, for example, one or more access point devices 104 without LLD support and one or more access point devices 104 with LLD support. In one or more embodiments, an access point device 104 can be an access point and/or a hardware electronic device that may be a combination modem and gateway that combines the functions of a modem (for example, a cable modem and/or a fiber optic modem), an access point (AP), and/or a router for providing content, data or information received from the broadband access equipment 103 to one or more other electronic devices, for example, client device 120 in the network environment 100 via a connection 116. An access point device 104 may also be referred to as a residential gateway, a home network gateway, or a wireless access point (AP). An access point device 104 can comprise any one or more components of the representative computer system 200 of FIG. 2.

The access point device 104 can comprise an optimizing agent 122 that identifies traffic associated with one or more client resources 113 for an optimized service flow, for example, any of an existing optimized service flow 132, a created optimized service flow 130, a modified existing optimized service flow 132, or any combination thereof. For example, the optimizing agent 122 can identify low latency traffic 107 for the existing optimized service 132 or identify low latency traffic 105 for the created optimized service flow 130. While the optimizing agent 122 is illustrated as part of the access point device 104 (network device 140B), the present disclosure contemplates that the optimizing agent 122 can be part of or included within a network device 140A, a network device 140B, or both. Optimizing agent 122 can comprise hardware, software or a combination thereof.

The access point device 104 can be connected to one or more client devices 120, for example, to a client device 120A via a connection 116A and/or to a client device 120B via a connection 116B. The connection 116 between the access point device 104 and the client device 120 can be implemented through a wireless connection that operates in accordance with, but is not limited to, any IEEE 802.11 protocols. Additionally, the connection 114 between the access point device 104, respectively, and the broadband access equipment 103 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G, or 6G network, for example. The connection 114 can also be implemented using a wireless connection in accordance with Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. In one or more embodiments, the connection 114 can also be a wired Ethernet connection. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or MSO provided content.

Figure 2:
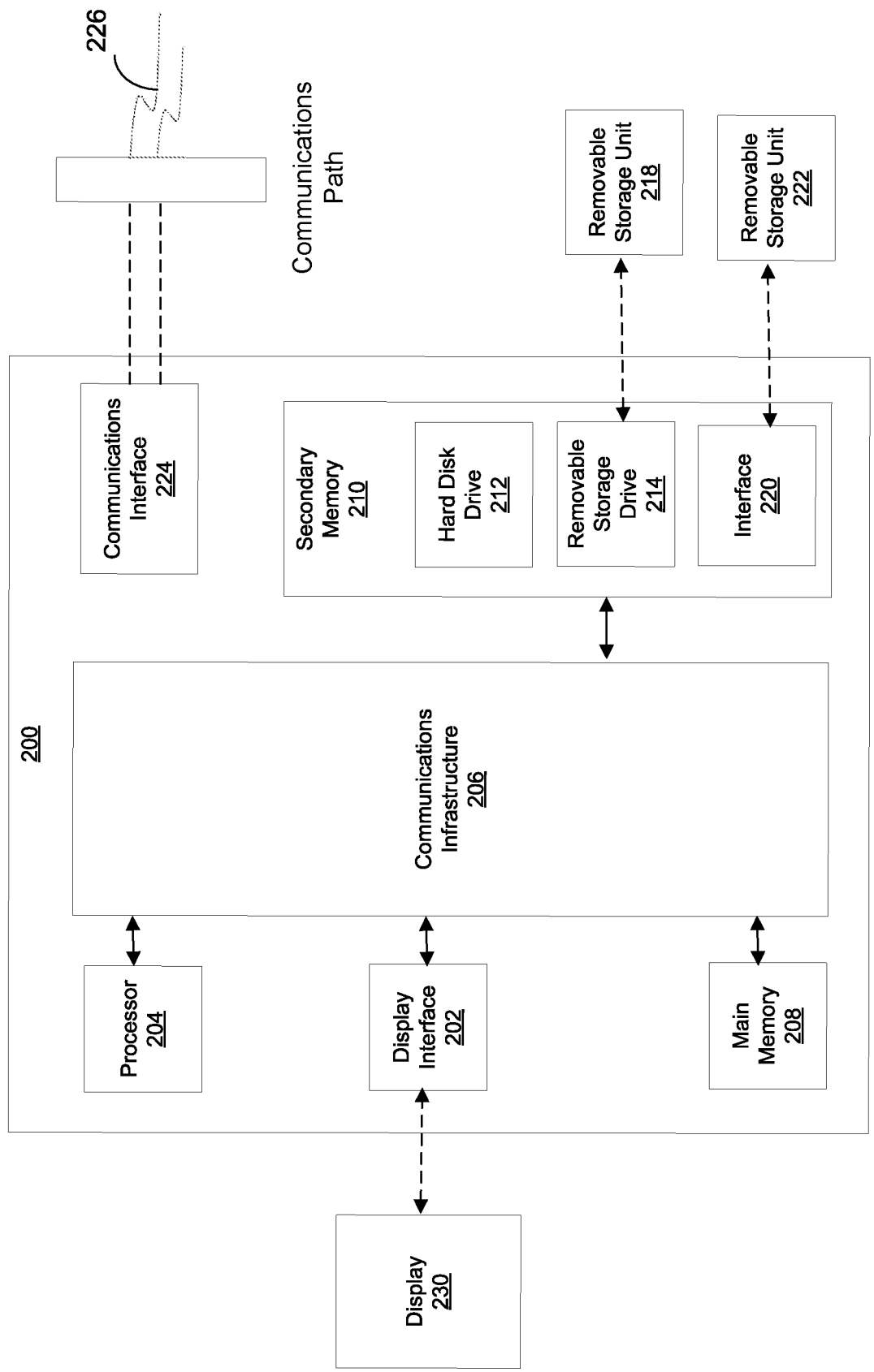
FIG. 2 illustrates a representative computer system in which embodiments of the present disclosure, or portions thereof, may be implemented as computer-readable code, according to one or more aspects of the present disclosure.

Client device 120 can comprise any one or more components of the representative computer system 200 of FIG. 2. Connection 116 can be implemented as discussed above with reference to connection 114. The client device 120B can include a client resource 113. In one or more embodiments, client device 120A, client device 120B, or any other client device 120 can be a network resource. Client resource 113 can be an application, a script, any other executable, an electronic device (such as a computer system 200 or other client device 120), or a combination thereof. While FIG. 1 illustrates a client resource 113 as part of the client device 120B, the present disclosure contemplates that the client resource 113 can be part of any other client device 120 or otherwise connected to the client device 120, a network device 140, any other electronic device, or a combination thereof. The access point device 104 can receive traffic 117 associated with a client resource 113 via the connection 116. In one or more embodiments, the client resource 113 can request that traffic 117 be communicated with low latency. In one or more embodiments, one or more settings associated with the client resource 113 can indicate that traffic associated with the client resource 113 should be prioritized or have low latency. In one or more embodiments, the low latency traffic 117 is communicated to the access point device 104 via connection 116 and the access point device 104 identifies the received low latency traffic 117 for an optimized service flow. The optimized service flow can be any of an existing or current service flow 132, a new optimized service flow 130, an existing or current service flow 130 that has been modified, or a combination thereof.

In one or more embodiments, a client device 120A can be a sensing device or any other electronic device that monitors or senses one or more environmental parameters associated with a network 100 or a site. For example, client device 120A can be any of type of monitoring or sensing device such as any of a smoke alarm or detector, a carbon monoxide detector, a temperature monitor, a humidity monitor, a motion, noise, and/or sound detection system, a security system, any other monitoring or sensing device, or any combination thereof. The one or more environmental parameters can be any parameter associated with the type of client device 120A such as any of a fire or smoke level, a carbon monoxide level, a temperature, a humidity level, a motion, a sound, a noise, a sensor or alarm activation or trigger, any other type of environmental parameter, or any combination thereof. The client device 120B can be an IoT device, for example, a device that performs a specific function with limited or no user interface. The client device 120A can be directly and/or indirectly connected to a low latency controller 102 via a connection 106 or via an access point device 104, respectively. The client device 120A can communicate a message to the low latency controller 102 indicative of an action, for example, associated with one or more monitored or sensed environmental parameters. The action can indicate a current status, such as a normal operating condition or an abnormal operating condition. For example, the action can be indicative of a comparison of sensed or monitored data associated with one or more environmental parameters to one or more thresholds.

FIG. 2 illustrates a representative computer system 200 in which embodiments of the present disclosure, or portions thereof, may be implemented as computer-readable code or one or more computer-readable instructions. For example, any of the optimizing agent 122, the client device 120, an access point device 104, a broadband access equipment 103, any other electronic or network device of FIG. 1, or any combination thereof may be implemented in whole or in part by a computer system 200 using hardware, software, firmware, non-transitory computer readable media having computer-readable instructions stored thereon, or a combination thereof and may be implemented in one or more computer systems or other processing systems. Hardware, software, or any combination thereof may embody modules and components used to implement the methods and steps of the present disclosure.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 218, a removable storage unit 222, and a hard disk installed in hard disk drive 212.

Various embodiments of the present disclosure are described in terms of this representative computer system 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 204 may be a special purpose or a general purpose processor device specifically configured to perform the functions discussed herein. The processor device 204 may be connected to a communications infrastructure 206, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 200 may also include a main memory 208 (e.g., random access memory, read-only memory, etc.), and may also include a secondary memory 210. The secondary memory 210 may include the hard disk drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. For example, if the removable storage drive 214 is a floppy disk drive or universal serial bus port, the removable storage unit 218 may be a floppy disk or portable flash drive, respectively. In one embodiment, the removable storage unit 218 may be non-transitory computer readable recording media.

In some embodiments, the secondary memory 210 may include alternative means for allowing computer programs or other instructions to be loaded into the computer system 200, for example, the removable storage unit 222 and an interface 220. Examples of such means may include a program cartridge and cartridge interface (e.g., as found in video game systems), a removable memory chip (e.g., EEPROM, PROM, etc.) and associated socket, and other removable storage units 222 and interfaces 220 as will be apparent to persons having skill in the relevant art.

Data stored in the computer system 200 (e.g., in the main memory 208 and/or the secondary memory 210) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SOL) database, a distributed database, an object database, etc. Suitable configurations and storage types will be apparent to persons having skill in the relevant art.

The computer system 200 may also include a communications interface 224. The communications interface 224 may be configured to allow software and data to be transferred between the computer system 200 and external devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, as, a phone line, a cellular phone link, a radio frequency link, etc.

The computer system 200 may further include a display interface 202. The display interface 202 may be configured to allow data to be transferred between the computer system 200 and external display 230. Exemplary display interfaces 202 may include high-definition multimedia interface (HDMI), digital visual interface (DVI), video graphics array (VGA), etc. The display 230 may be any suitable type of display for displaying data transmitted via the display interface 202 of the computer system 200, including a cathode ray tube (CRT) display, liquid crystal display (LCD), light-emitting diode (LED) display, capacitive touch display, thin-film transistor (TFT) display, etc.

Computer program medium, computer readable medium, and computer usable medium may refer to memories, such as the main memory 208 and secondary memory 210, which may be memory semiconductors (e.g., DRAMs, etc.). These computer program products may be means for providing software to the computer system 200. Computer programs (e.g., computer control logic) may be stored in the main memory 208 and/or the secondary memory 210. Computer programs may also be received via the communications interface 224. Such computer programs, when executed, may enable computer system 200 to implement the present methods as discussed herein. In particular, the computer programs, when executed, may enable processor device 204 to implement the methods illustrated by FIGS. 1, 3, 4, 5 and 6 as discussed herein. Accordingly, such computer programs may represent controllers of the computer system 200. Where the present disclosure is implemented using software, the software may be stored in a computer program product and loaded into the computer system 200 using the removable storage drive 214, interface 220, and hard disk drive 212, or communications interface 224.

The processor device 204 may comprise one or more modules or engines configured to perform the functions of the computer system 200. Each of the modules or engines may be implemented using hardware and, in some instances, may also utilize software, such as corresponding to program code and/or programs stored in the main memory 208 or secondary memory 210. In such instances, program code may be compiled by the processor device 204 (e.g., by a compiling module or engine) prior to execution by the hardware of the computer system 200. For example, the program code may be source code written in a programming language that is translated into a lower level language, such as assembly language or machine code, for execution by the processor device 204 and/or any additional hardware components of the computer system 200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 200 to perform the functions disclosed herein. It will be apparent to persons having skill in the relevant art that such processes result in the computer system 200 being a specially configured computer system 200 uniquely programmed to perform the functions discussed above.

Figure 3A:
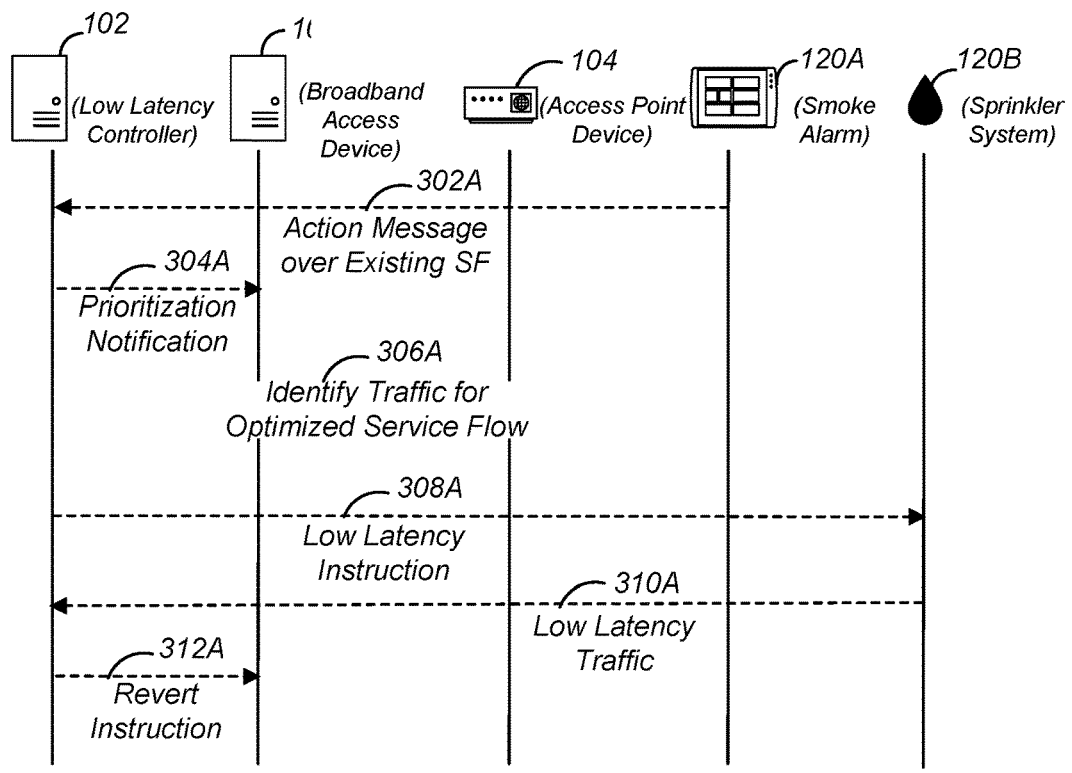
FIGS. 3A and 3B are diagrams illustrating identifying low latency traffic associated with a client resource for an optimized service flow in a network environment, according to one or more aspects of the present disclosure.

FIG. 3A is a diagram illustrating identifying low latency traffic associated with a client resource 113 for an optimized service flow in a network environment 150, according to one or more aspects of the present disclosure. In one or more embodiments, a network device 140, such as an access point device 104, can communicate with the low latency controller 102 to send and/or receive information about one or more client resources 113 that require low latency to ensure that the user of the client resource 113 has an expected or enhanced experience, for example, a client device 120B can be a client resource 113. For example, a sprinkler system 120B can be a client resource 113 that requires low latency. The low latency controller 102 of the network resource 101 can establish a connection via a broadband access equipment 103 with an access point device 104. The low latency controller 102 can be part of or connected to a network resource 101 associated with the client device 120A and/or network 100. The low latency controller 102 can receive information or data corresponding to or associated with one or more client resources 113, for example, an action message 302A over an existing service flow from a client device 120A, such as a smoke alarm 120A. In one or more embodiments, the action message 302A can be sent directly from the smoke alarm 120A to the low latency controller 102, for example, via a wireless broadband connection such as long-term evolution (LTE). In one or more embodiments, the client device 120A sends the action message 302A to the low latency controller 102 via an access point device 104 connected to a broadband access device 103.

Figures 4, 5:
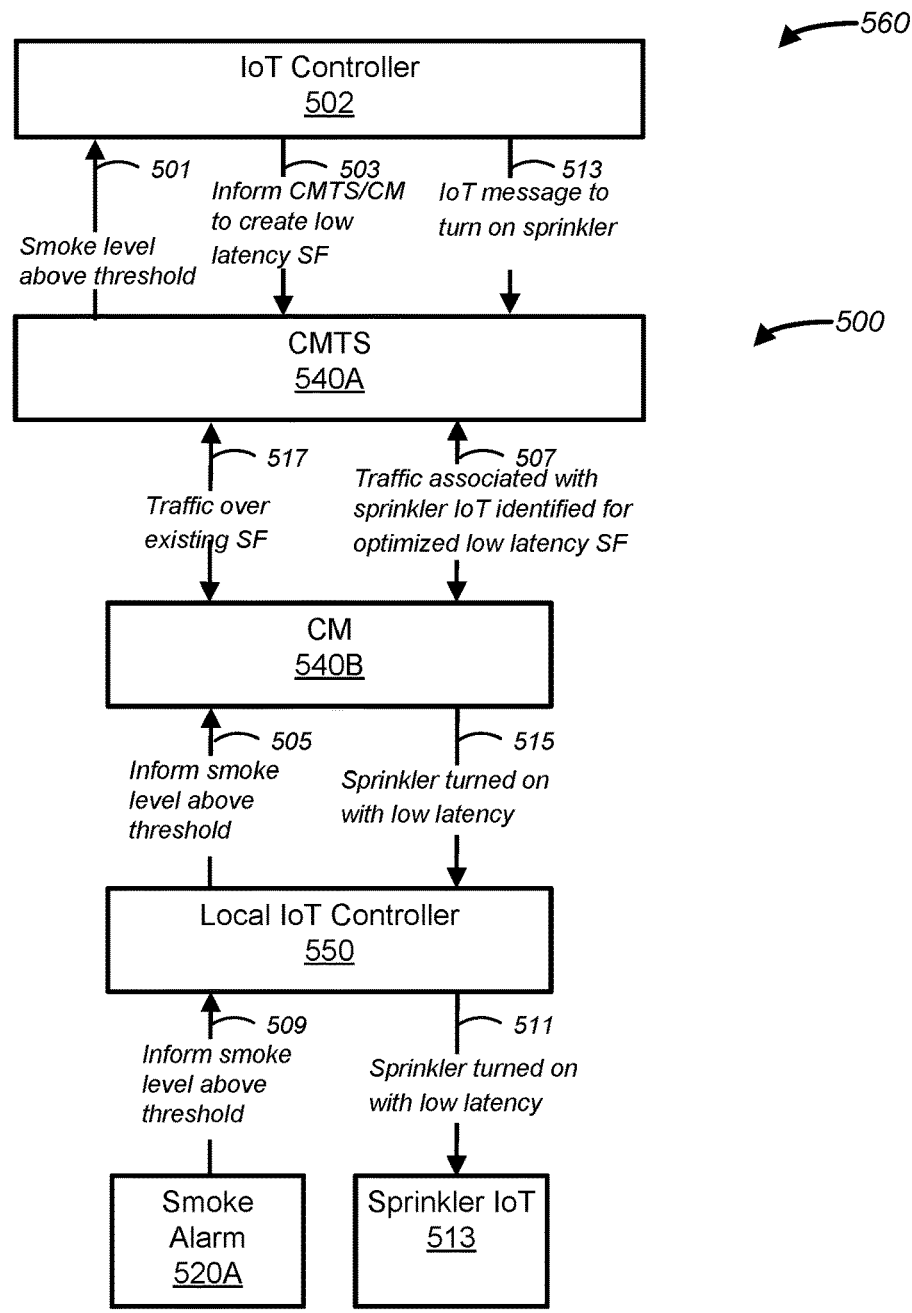
FIG. 4 illustrates an example action message, according to one or more aspects of the present disclosure.
FIG. 5 illustrates an example network that provides an optimized service flow for low latency traffic associated with a particular client resource, according to one or more aspects of the present disclosure.

In one or more embodiments, the action message 302A can include one or more priority parameters as indicated in FIG. 4, data associated with one or more environmental parameters, an alert or other indication associated with a threshold, any other information, or any combination thereof. The one or more priority parameters can include any of a status 402 or information associated with one or more environmental parameters, a client resource identifier 404, a priority level identifier 406, a priority indicator 408, any other sensed or monitored parameter, or any combination thereof. For example, the action message 302A from a smoke alarm 120A can include a status 402 indicative of a fire or a threshold associated with detection of smoke has been reached or exceeded. The client resource identifier 404 can be associated with a sprinkler system 120B or any other client resource 113 associated with the smoke alarm 120A. The priority level identifier 406 can indicate a requested low latency or QoS level for traffic associated with the sprinkler system 120B. The priority indicator 408 can indicate an urgency of the traffic. For example, the status 402 can be indicative of a fire or other emergency, the client resource identifier 404 can identify one or more client resources 120B, such as sprinkler system 120B, the priority level identifier 406 can indicate the highest level of QoS or prioritization, the priority indicator 408 can indicate the urgency of the prioritization, such as that the traffic should be immediately or quickly identified for an optimized service level as opposed to at a next interval or expiration of a time period.

The low latency controller 102 can receive the action message 302A from a network device 140, such as broadband access device 103 or access point device 104. In response to the action message 302A, the low latency controller 102 can send a prioritization notification 304A to an optimizing agent 122 of a network device 140, for example, the access point device 104 or the broadband access device 103. The low latency controller 102 can push or send the prioritization notification 304A to an optimizing agent 122 of the network device 140 based on the priority indicator 408, periodically, at timed intervals, based on detection or determination that certain client resources 113 require prioritization, any other basis, or any combination thereof. The prioritization notification 304A can be indicative of a low latency requirement associated with the sprinkler system 120B, such that the traffic of or associated with the client resource 113 is prioritized. For example, the prioritization notification 304A can comprise any of the one or more optimization settings of the traffic associated with the one or more client resources 113, one or more identifiers associated with the traffic, one or more identifiers associated with the one or more client resources 113 so as to indicate that the traffic associated with the one or more client resources 113 should be treated as low latency traffic, any other field or value, or a combination thereof. The one or more optimization settings can include a priority level, an identifier, a duration, a time/date, any other setting, or a combination thereof. The priority level can be any value, for example, a value indicative of a QoS level. The identifier can be a unique identifier associated with a particular client application, network device, or both. The identifier can be associated with a group of client applications, network devices, or any combination thereof. A duration can indicate a length of time that the priority level is applied to traffic associated with the selection. The time/date can indicate a day of week, time of day or both that the priority level is applied to traffic associated with the selection.

An optimizing agent 122 of the network device 140 can receive the prioritization notification 304A from the low latency controller 102. For example, an optimizing agent 122 of the broadband access device 103 can receive the prioritization notification 304A from the low latency controller 102. The optimizing agent 122 can identify traffic for an optimized service flow 306A where the traffic is associated with the sprinkler system 120B based on the prioritization notification 304A. For example, a DSX (dynamic service addition/change/deletion) message can be sent from the access point device 104 to the broadband access equipment 103 and/or from the broadband access equipment 103 to the access point device 104. The DSX message can include one or more low latency tag, length and value (TLV) parameters to create/modify/delete the associated low latency service flow (the optimized service flow).

In one or more embodiments, the identifying by the optimizing agent 122 can comprise creating an optimized service flow 105, modifying one or more service flow parameters of an existing service flow of one or more existing service flows 107 so that traffic or packets are sent with low latency, or selecting a low latency service flow from the one or more existing service flows 107 on which low latency packets are currently routed. In one or more embodiments, creating the optimized service flow can include the optimizing agent 122 creating a service flow, for example, a lightly loaded service flow with a high priority that achieves a minimum round-trip delay (Tmin). The traffic or packets on this created optimized service flow are sent with or experience a minimum latency. For example, a DSA message, that comprises one or more low latency parameters of the to be created or new optimized service flow, can be sent from the access point device 104 to the broadband access equipment 103 (for example, a cable modem termination system (CMTS)) so as to add this new service flow. This newly created optimized service flow can be deleted or removed based on the one or more optimization settings associated with a client resource 113, a subsequent prioritization notification 304 that indicates that the client resource 113 no longer requires low latency, when the client resource 113 is closed or otherwise not utilized, or any combination thereof. In one or more embodiments, the optimizing agent 122 can send a dynamic service delete (DSD) message to the broadband access equipment 103 to delete the service flow selected as the optimized service flow.

In one or more embodiments, modifying the one or more service flow parameters of an existing service flow of the one or more existing service flows 107 so that the traffic or packets associated with a client resource 113 are sent with low latency can be based on the one or more optimization settings associated with the client resource 113. Modifying the one or more service flow parameters can be based on one or more TLV parameters received in a DSX message. The one or more service flow parameters can include any of a traffic class, an admitted QoS parameter, an active QoS parameter, any other service flow parameter, or any combination thereof. For example, the one or more optimization settings can indicate a prioritization or a low latency for the traffic associated with the client resource 113 such that the access point device 104 sends a dynamic service change (DSC) message to broadband access equipment 103 to modify one or more service flow parameters associated with the existing service flow so as to indicate low latency. For example, the DSC message can change the admitted and active QoS parameters of the service flow such that traffic identified for the service flow experiences low latency. The upstream service flow, the downstream service flow, or both can be modified by the DSC message as provided by DOCSIS. In this way, the existing service flow is repurposed dynamically to route low latency traffic or packets associated with the client resource 113. The duration of the repurposing can be based on the one or more optimization settings. Once the duration has been met, the one or more service flow parameters associated with the existing service flow can be reverted back to the previous values, default values, or any other settings. In one or more embodiments, the low latency controller 102 can receive information or data that indicates that the traffic associated with a client resource 113 no longer requires low latency or a prioritization. The low latency controller 102 can send a revert instruction 312A to the broadband access equipment 103 to revert one or more settings associated with the client resource 113 so that associated traffic is no longer identified for an optimized service flow or given a higher priority such that the associated traffic is no longer designated as low latency. In one or more embodiments, the reversion can occur based on the one or more optimization settings, a subsequent prioritization notification 304 that indicates that the network resource 113 no longer requires low latency, when the network resource 113 is closed or otherwise not utilized, or any combination thereof. In one or more embodiments, the optimizing agent 122 can send a dynamic service delete (DSD) message to the broadband access equipment 103 to delete the service flow selected as the optimized service flow.

In one or more embodiments, selecting a low latency service flow from the one or more existing service flows 107 on which low latency packets are currently routed can include identifying one or more traffic class attributes associated with one or more existing service flows and one or more service flows of the one or more existing service flows on which low latency packets are currently routed. The optimizing agent 122 can determine or select a service flow of the one or more existing service flows that is associated with a higher QoS or low latency based on one or more low latency parameters, such as traffic class attributes, a usage factor (such as available bandwidth, usage percentage, or both), or both, and identify the traffic or packets associated with the client resource 113 for the selected low latency service flow. For example, the National Broadband Network (NBN) in Australia has identified at least three traffic class attributes including traffic class 1 (TC1) associated with voice traffic, traffic class 2 (TC2) associated with video traffic, and traffic class 4 associated with a best effort transmission of traffic. Data or traffic associated with TC1 and/or TC2 are given a high priority. The optimizing agent 122 can determine one or more traffic class attributes associated with a service flow that provides low latency. The low latency service flow can be selected or identified based on the one or more traffic class attributes. The identified traffic can be routed as TC1 and/or TC2 as the optimized service flow so that the identified traffic will be given high priority. For a passive optical network (PON), a configuration file can be modified to indicate a low latency service flow for selection as the optimized service flow. The routing of the traffic or packets associated with the client resource 113 on the selected service flow can be stopped such that the traffic or packets are no longer given a priority based on the one or more optimization settings, a subsequent prioritization notification 304 that indicates that the network resource 113 no longer requires low latency, when the network resource 113 is closed or otherwise not utilized, or any combination thereof.

In one or more embodiments, the traffic associated with the client resource 113 is directed or put on to the optimized service flow based on the one or more optimization settings. For example, the source port (sport) gets remapped to a different source port (nport). In one or more embodiments, specific DSCP markings of the traffic associated with the first client resource 113 are set based on the one or more optimizations settings. In one or more embodiments, the one or more optimization settings can include a protocol, a source IP address, a source port, a destination IP address, and a destination port associated with the client resource 113. An LLD capable access point device 104, for example, can push the one or more optimization settings to a controller 102 (for example, an LLD controller). The controller 102 can push the one or more optimization settings to the access point device 104 that does not include LLD support. The access point device 104 can use the one or more optimization settings to prioritize traffic from the client resource 113, for example, identify traffic associated with the client resource 113 for an optimized service flow.

In one or more embodiments, the low latency instruction 308A is put on the appropriate optimized service flow for communication between the low latency controller 102 and the sprinkler system 120B via the broadband access equipment 103 and the access point device 104. The low latency instruction 308A is identified for the optimized service flow so that the low latency instruction 308A is prioritized. For example, the low latency controller 102 can send a low latency instruction 308A that causes the sprinkler system 120B to activate based on the action message 302A. In one or more embodiments, the action message 302A can also identify traffic from the client device 120A as requiring low latency. For example, the smoke alarm 120A can send low latency traffic 310A, similar to the action message 302A, to the low latency controller 102 so as to provide an update for one or more environmental parameters. For example, the low latency traffic 310A can indicate that the fire or the smoke has subsided such that the low latency controller 102 can send a low latency instruction 310A to deactivate the sprinkler system 120B.

In one or more embodiments, the low latency controller 102 can receive information or data that indicates that the traffic associated with the sprinkler system 120B, the smoke alarm 120A, any other client resource 113, or any combination thereof no longer requires low latency or a prioritization. The low latency controller 102 can send a revert instruction 312A to the broadband access equipment 103 to revert one or more settings associated with the sprinkler system 120B, the smoke alarm 120A, any other client resource 113, or any combination thereof so that associated traffic is no longer identified for an optimized service flow or given an elevated priority. For example, the low latency controller 102 can send a revert instruction 312A to the broadband access equipment 103 to revert one or more settings associated with the sprinkler system 120B, the smoke alarm 120A, any other client resource 113, or any combination thereof so that the associated traffic is no longer identified for an optimized service flow or given an elevated priority.

In one or more embodiments, the reversion can occur or the revert instruction 312A based on the one or more optimization settings, a subsequent prioritization notification 304A that indicates that the network resource 113 no longer requires low latency, when the network resource 113 is closed or otherwise not utilized, or any combination thereof. In one or more embodiments, the optimizing agent 122 can send a dynamic service delete (DSD) message to the broadband access equipment 103 to delete the service flow selected as the optimized service flow. The routing of the traffic or packets associated with the client resource 113 on the selected service flow or the optimized service flow can be stopped such that the traffic or packets are no longer given a priority based on the one or more optimization settings, a subsequent prioritization notification 304A that indicates that the network resource 113 no longer requires low latency, when the network resource 113 is closed or otherwise not utilized, or any combination thereof. In one or more embodiments, the optimizing agent 122 can send a dynamic service delete (DSD) message to the broadband access equipment 103 to delete the service flow selected as the optimized service flow.

While FIG. 3A illustrates an example smoke alarm and sprinkler system 120B as a client resource 113, the present invention contemplates any type of client device 120 or application can be a client resource 113. For example, the client resource 113 can be associated with a sensing device for sensing or monitoring one or more biometrics, such as blood pressure, temperature, oxygen level, pulse rate, any other biometric, or a combination thereof. A client device 120 that acts as data collector can request that traffic associated with the client resource 113 receive prioritization or be identified for an optimized service flow such that the client device 120 can tag data collected from the sensing device and that tagged data can be identified by the access point device 104, the broadband access equipment 103 or both for an optimized service flow. As another example, a wind speed detector can be a client resource 113 that detects wind speed such that once wind speed exceeds a threshold, for example, indicative of an approaching hurricane, traffic associated with the wind speed detector can be identified for an optimized service flow.

Figure 3B:
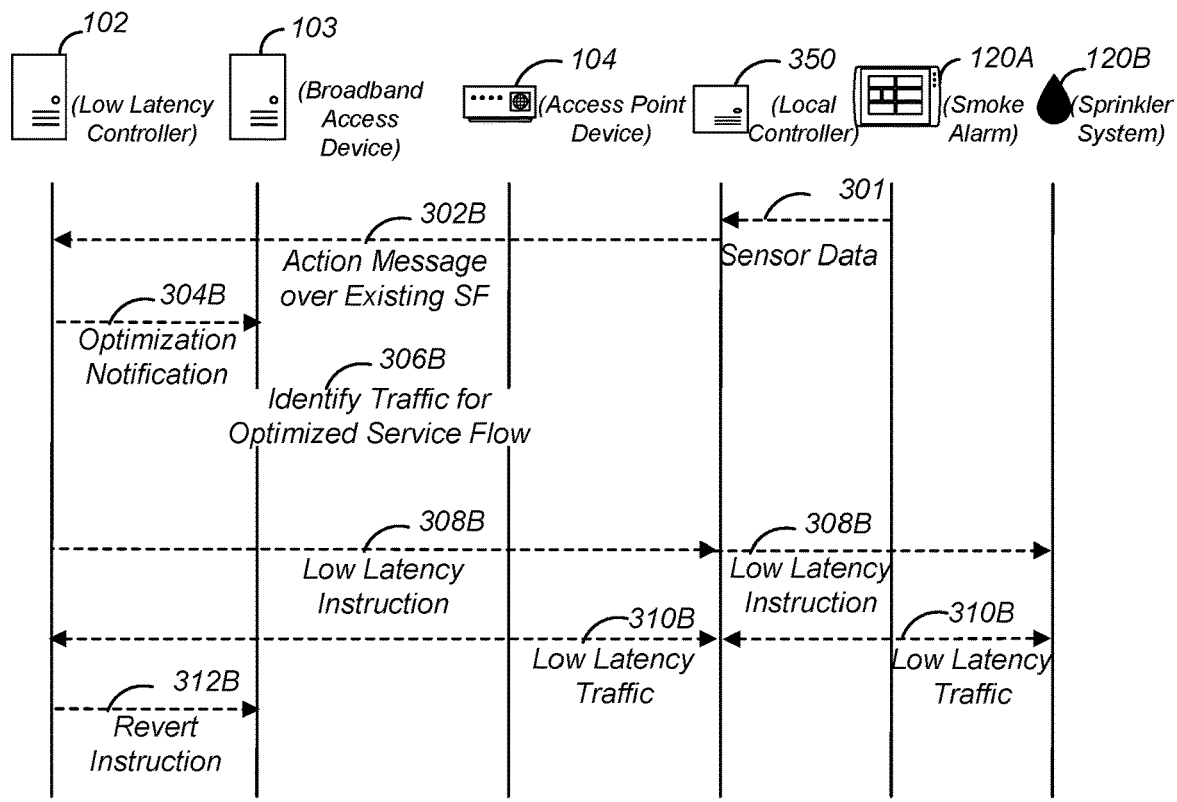

FIG. 3B is a diagram illustrating identifying low latency traffic associated with a client resource 113 for an optimized service flow in a network environment 100, according to one or more aspects of the present disclosure. FIG. 3B is similar to FIG. 3A except that FIG. 3B includes a local controller 350. For example, a local controller 350 can include a computer system 200 for managing and/or controlling one or more client devices 120 in the network environment 100. The local controller 350 can receive sensor data 301, for example, from an IoT device, such as smoke alarm 120A. The local controller 350 can determine that traffic associated with the smoke alarm 120A should receive prioritization or be identified for an optimized service flow based on the sensor data 301. The local controller 350 can send an action message 302B to a low latency controller 102 so that the low latency controller 102 can send an optimization notification 304B to an optimizing agent 122 of a network device 140, for example broadband access device 103.

In one or more embodiments, the local controller 350 can send an action message 302B to an optimizing agent 122 of a network device 140 so that the optimizing agent 122 will identify traffic for an optimized service flow 306B. The low latency controller 102 can send a low latency instruction 308B on an optimized service flow to the local controller 350. The local controller 350 relays or sends the low latency instruction 308B to the sprinkler system 120B, for example, to activate the sprinkler system 120B. The local controller 350 can send and receive low latency traffic 310B on the optimized service flow. For example, the local controller 350 can receive low latency traffic 310B from the low latency controller 102 via an optimized service flow and send the low latency traffic 310B to the sprinkler system 120B. Similarly, the local controller 350 can receive low latency traffic 310B from the sprinkler system 120B and send the low latency traffic 310B to the low latency controller 102 via an optimized service flow. If or when the sensor data 301 indicates that one or more environmental parameters are within a normal range or do not meet, exceed or both a threshold, the optimized service flow can be modified. For example, once traffic associated with the client resource 113, for example, the smoke alarm 120A, sprinkler system 120B or both, is no longer required to be prioritized or identified for an optimized service flow, the low latency controller 102 can send a revert instruction 312B to the broadband access device 103 to restore the network environment 100 to the previous condition or state, such as to remove the optimized service or modify one or more service flow parameters, optimization parameter, and/or low latency parameters.

By utilizing a low latency controller and/or a local controller, traffic or packets associated with a client resource 113 can be identified for an optimized service flow so as to provide an improvement in latency for the traffic or the packets. In this way, a client resource 113 can experience low latency without requiring reconfiguration of the network environment 100, downtime of any one or more network devices, personnel costs, and/or delay in providing the functionality or operation associated with the client resource 113.

FIG. 5 illustrates an example network that provides an optimized service flow for low latency traffic associated with a particular client resource, according to one or more aspects of the present disclosure. The network environment 560 and network 500 are similar to the network environment 150 and network 100, respectively, of FIG. 1 except that the low latency controller 102 comprises an IoT controller 502, the network device 140A comprises a CMTS 540A, the network device 140B comprises a cable modem (CM), the client device 120A comprises a smoke alarm 520A, and the client resource 113 comprises a sprinkler IoT device 513. The local IoT controller 550 is similar to or the same as the local controller 350 of FIG. 3. The IoT controller 502 is connected to a network 500, for example, via a CMTS 540A. The CMTS 540A is connected to a cable modem (CM) 540B and the CM 540B is connected to a local IoT controller 550. The local IoT controller 550 is connected to a smoke alarm 520A and a sprinkler IoT 513 (such as sprinkler IoT 120B of FIGS. 3A and 3B) to provide traffic associated with the smoke alarm 520A and the sprinkler IoT 513 to the CM 540B. In one or more embodiments, the network 500 can include any one or more client devices 120 of FIG. 1 and the one or more client devices 120 can be or include one or more client resources 113, for example, one or more IoT devices. In one or more embodiments, the network 500 does not include the local IoT controller 550 such that the smoke alarm and the sprinkler IoT 113 are connected to the CM 140B directly or indirectly via any one or more other network devices, such as network devices 140 and/or 540.

In one or more embodiments, a smoke alarm 520A sends a message 509 to the local IoT controller 550 that is indicative of an environmental parameter, for example, a smoke level at or above a smoke level threshold. The local IoT controller 550 sends the received message 509 as a client message 505 to the CM 540B that is indicative of a smoke level that is at or above a smoke level threshold. The CM 540B sends the client message 505 as traffic 517 over an existing service flow to a CMTS 540A. The CMTS 540A sends a smoke level at or above threshold message 501 to the IoT controller 502. The IoT controller 502 informs the CMTS 540A and/or CM 540B to create a low latency service flow via a create service flow instruction 503. The CMTS 540A and/or the CM 540B creates a low latency service flow (an optimized service flow) for sending and/or receiving the traffic associated with the sprinkler IoT 513 based on the create service flow instruction 503. Once the optimized service flow is created (or an existing service flow is modified or identified as a low latency service), traffic associated with sprinkler IoT 513 identified for optimized low latency service flow 507.

The IoT controller 502 can send an IoT client resource message 513 to turn on the sprinkler IoT 513 based on the threshold message 501 which is based on the received message 509. The IoT client resource message 513 is associated with the optimized service flow, for example, the IoT message can include one or more optimization settings, a prioritization notification, any other indicator that the IoT client resource message 513 should be identified for the optimized service flow, or any combination thereof that an optimizing agent 122 (not shown) of the CM 540B and/or the CMTS 540A uses to identify the IoT client resource message 513 for the optimized service flow. For example, the CMTS 540A can identify the IoT client resource message 513 as traffic 507 associated with the sprinkler IoT 513 for the optimized service flow created based on the service flow instruction 503. The CM 540B can send the low latency IoT client resource message 513 as a low latency sprinkler instruction 515 to the local IoT controller 550. The local IoT controller 550 can send the low latency sprinkler instruction 515 to the sprinkler IoT 513 as a command 511 that instructs the sprinkler IoT 513 to turn on. Similarly, a command 511 can instruct the sprinkler IoT 513 to transition to any or more other states, such as off.

While FIG. 5 illustrates a smoke alarm 520A as a client device 120 and a sprinkler IoT 513 as a client resource 113, the present disclosure contemplates any one or more client devices 120, one or more applications, one or more IoT devices, any other resource, or any combination thereof can be a client resource 113. Also, while FIG. 5 illustrates creating a low latency service as the optimized service flow, the present disclosure contemplates that an existing service flow can be modified or otherwise selected as the optimized service flow.

Figure 6:
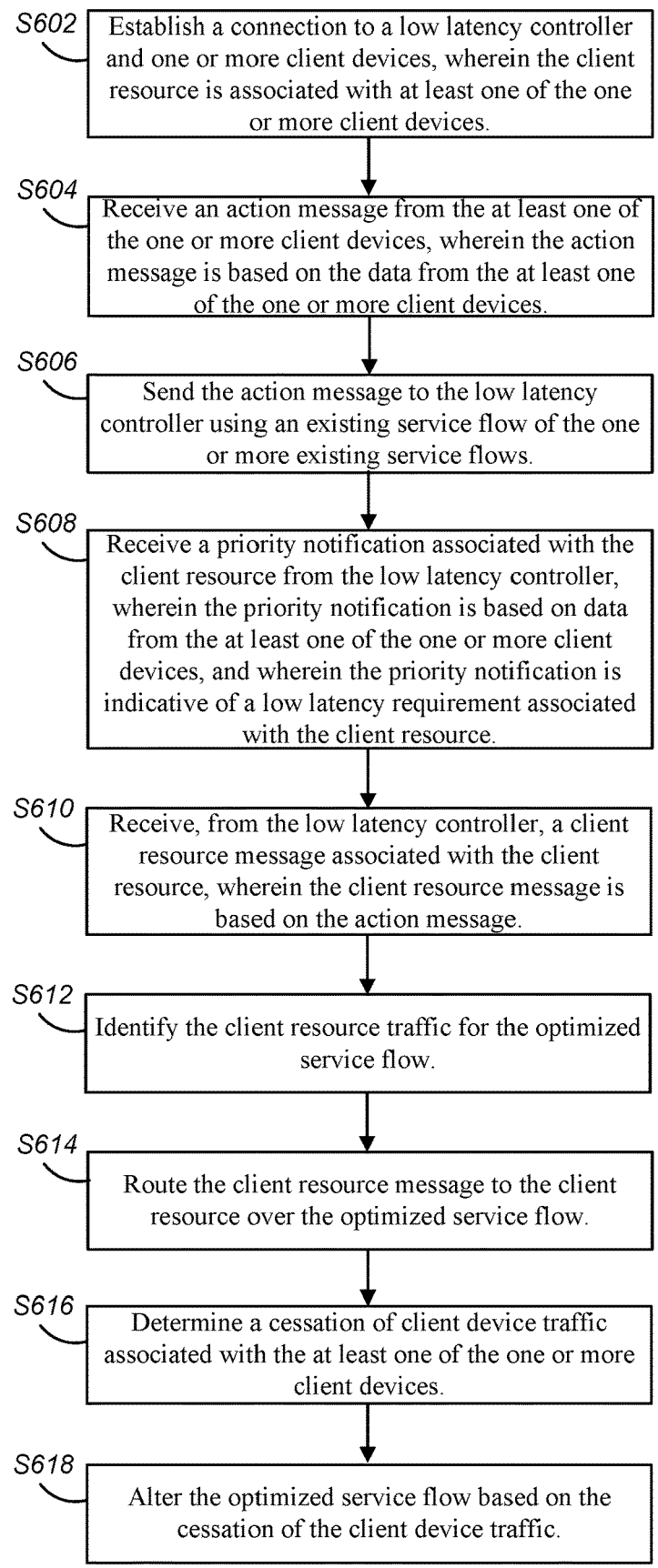
FIG. 6 is a flow diagram for an optimizing agent of a network device to identify traffic associated with a client resource for an optimized service flow, according to one or more aspects of the present disclosure.

FIG. 6 is a flow diagram for an optimizing agent 122 of network device 140, for example, an access point device 104 or a broadband access equipment 103, to identify traffic associated with a client resource 113 for an optimized service flow such that the traffic is routed to the optimized service flow to achieve the low latency required by the client resource 113, according to one or more aspects of the present disclosure. The optimizing agent 122, the access point device 104, the broadband access equipment 103, the client device 120, or any other network device or electronic device may be programmed with one or more computer-readable instructions that when executed by a controller or processor of the network device cause one or more operations according to FIG. 6. In FIG. 6, it is assumed that any one or more of the devices include their respective controllers and their respective software, for example, optimizing agent 122, stored in their respective memories, as discussed above in connection with any of FIGS. 1-5, which when executed by their respective controllers perform the functions and operations in accordance with the example embodiments of the present disclosure (e.g., including performing a configuration of one or more network devices). While the steps S602-S618 are presented in a certain order, the present disclosure contemplates that any one or more steps can be performed simultaneously, substantially simultaneously, repeatedly, in any order or not at all (omitted).

At S602, the optimizing agent 122 of a network device 140 of a network 100 establishes a connection to a low latency controller 102, for example, of a network resource 101. The network 100 can include any one or more access point devices 104, one or more client devices 120, and one or more client resources 113. In one or more embodiments, the client resource 113 is an IoT device and a local IoT controller 550 is connected between the access point device 104 and the IoT device. The connection established between the network device 140 and the low latency controller 102 provides information about the one or more client resources 113 that need or require low latency. In one or more embodiments, the client resource 113 is associated with at least one of the one or more client devices 120.

At step S604, the optimizing agent 122, for example, receives an action message 302 from the at least one of the one or more client devices 120 associated with the client resource 113. For example, the at least one of the one or more client devices 120 can sense or monitor one or more environmental parameters where the one or more environmental parameters are associated with the functioning or operation of the client resource 113. Based on the sensed or monitored one or more environmental parameters, the at least one of the one or more client devices 120 can send an action message or data 302 to a network device 140, such as access point device 104. For example, a smoke alarm can send data associated with a detected smoke level or a biometric monitoring device can send data associated with a biometric.

At step 606, the optimizing agent 122, for example, sends the action message 302 to the low latency controller 102 using an existing service flow of the one or more existing service flows. In one or more embodiments, the action message 302 can be sent from the at least one of the one or more client devices 120 to the low latency controller 102 via a cellular communications connection such that the optimizing agent 122 and/or the network device 140 is bypassed.

At step S608, the optimizing agent 122, for example, receives a prioritization notification 304 associated with the client resource 113 from the low latency controller 102 over one or more existing service flows. The prioritization notification 304 can include or be based on one or more optimization settings indicative of a low latency requirement associated with the client resource 113, data from the at least one of the one or more client devices, or any combination thereof. For example, the prioritization notification can include an identifier associated with the client resource 113 that requires low latency and an associated low latency or QoS level. In this way, the prioritization notification can be indicative of a low latency requirement associated with the client resource 113.

At step S610, the optimizing agent 122, for example, receives from the low latency controller 102 a client resource message 513 associated with the client resource 113. The client resource message 513 can be based on the action message 302. For example, the client resource message 513 can indicate a change to an operation or function associated with the associated client resource 113, such as indicating that the client resource 113 should be activated or deactivated.

At step S612, the optimizing agent 122, for example, identifies the traffic associated with the client resource 113 for the optimized service flow. This optimized service flow can be an existing service flow of the one or more existing service flows or a new service flow. The optimizing agent 122 can, for example, identify the traffic for the optimized service flow by one or more processes. In a first process, a low latency service flow from the one or more existing service flows on which one or more low latency packets are currently routed is selected as the optimized service flow. The low latency service flow can be selected by determining one or more traffic class attributes associated with the low latency service flow, determining a usage factor associated with the low latency service flow, and identifying the low latency service flow based on the traffic class, the usage factor or both.

In a second process, a service flow of the one or more existing service flows is selected as the optimized service flow and one or more service flow parameters of the optimized service flow are modified to achieve low latency or the required QoS level. For example, the access point device 104 that includes the optimizing agent 122 that modifies the one or more service flow parameters, for example, by sending a DSC message to a broadband access equipment 103.

In a third process, a new service flow is created as the optimized service flow. This new service flow can be created to comprise one or more low latency parameters indicative of the low latency required or needed by the client resource 113. For example, the access point device 104 can include an optimizing agent 122 that sends a DSA message to a broadband access equipment 103 to create the new service flow. This DSA message can comprise the one or more low latency parameters.

At step S614, the optimizing agent 122 can route the traffic to the optimized service flow so that the traffic experiences a low latency or the required QoS level. For example, the client resource message 513 is routed to the client resource 113 over the optimized service flow. In this way, traffic associated with the client resource 113 is identified for an optimized service flow and routed so as to achieve or experience low latency.

At step S616, the optimizing agent 122 can determine a cessation of the traffic associated with the client resource 113. For example, the client resource 113 can be any of an application that is closed or otherwise suspended, a network device that is disconnected, powered off or otherwise loses connectivity to the network 100, any other cessation, or any combination thereof. At step S412, the optimizing agent 122 can alter the optimized service flow based on the cessation of the traffic associated with the client resource 113. For example, the cessation of the traffic can be associated with any of an application that is closed or otherwise suspended, a client device 120 that is disconnected, powered off or otherwise loses connectivity to the network 100, one or more environmental parameters sensed or monitored by a client device 120, an expiration of a time period, a comparison of data, for example one or more environmental parameters, to a threshold, any other cessation, or any combination thereof.

At step S618, the optimizing agent 122, for example, alters the optimized service flow based on the cessation of the client device traffic. The optimized service flow can be altered by deleting the optimized service flow, modifying the optimized service flow, or reverting the optimized service flow to the previous status of the optimized service flow as discussed with reference to FIG. 3A or 3B.

Techniques consistent with the present disclosure provide, among other features, systems and methods for a network environment that includes a low latency controller to provide a prioritization notification to a network device so that traffic associated with a client resource receives low latency prioritization including traffic of a client device 120 associated with the client resource 113, traffic of a network resource 101 or low latency controller 102, traffic of the client resource 113, or any combination thereof. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A method for an optimizing agent of a network device to identify client resource traffic associated with a client resource for an optimized service flow, the method comprising:
    establishing a connection to a low latency controller and tone or more client devices, wherein the client resource is associated with at least one of the one or more client devices;
    receiving a priority notification associated with the client resource from the low latency controller, wherein the priority notification is based on data from the at least one of the one or more client devices, and wherein the priority notification is indicative of a low latency requirement associated with the client resource; and
    identifying the client resource traffic for the optimized service flow, wherein identifying the client resource traffic on the optimized service flow comprises one of:
        modifying one or more parameters of the optimized service flow, wherein the optimized service flow is one of the one or more existing service flows;
        creating a new service flow as the optimized service flow; or
        selecting a low latency service flow from the one or more existing service flows on which low latency packets are currently routed as the optimized service flow based on an usage factor associated with the low latency service flow.

2. The method of claim 1, further comprising:
    receiving an action message from the at least one of the one or more client devices, wherein the action message is based on the data from the at least one of the one or more client devices;
    sending the action message to the low latency controller using an existing service flow of the one or more existing service flows; and
    wherein the priority notification is based on the action message.

3. The method of claim 2, further comprising:
    receiving, from the low latency controller, a client resource message associated with the client resource, wherein the client resource message is based on the action message; and
    routing the client resource message to the client resource over the optimized service flow.

4. The method of claim 3, wherein:
    the client resource is an Internet of Things (IoT) device;
    a local IoT controller is connected between the network device and the client resource; and
    the routing the client resource message to the client resource comprises routing the client resource message to the local IoT controller.

5. The method of claim 1, wherein identifying the client resource traffic on the optimized service flow comprises selecting the low latency service flow, and wherein selecting the low latency service comprises:
    determining one or more traffic class attributes associated with the low latency service flow;
    selecting a traffic class associated with the low latency service flow based on the one or more traffic class attributes;
    determining a usage factor associated with the low latency service flow; and
    routing the client resource traffic to the low latency service flow based on the traffic class and the usage factor.

6. The method of claim 1, wherein the priority notification is also indicative of a low latency requirement associated with the at least one of the one or more client devices such that client device traffic associated with the at least one of the one or more client devices is also identified for the optimized service flow.

7. The method of claim 1, further comprising:
    determining a cessation of client device traffic associated with the at least one of the one or more client devices; and
    altering the optimized service flow based on the cessation of the client device traffic, wherein altering the optimized service flow comprises one of:
        reverting the modification of the one or more parameters;
        deleting the new service flow; or
        ceasing routing of the client resource traffic on the optimized service flow.

8. A network device for identifying client resource traffic associated with a client resource for an optimized service flow, the network device comprising:
a memory storing one or more computer-readable instructions of an optimizing agent of the network device; and
a processor configured to execute the one or more computer-readable instructions to:
establish a connection to a low latency controller and one or more client devices, wherein the client resource is associated with at least one of the one or more client devices;
receive a priority notification associated with the client resource from the low latency controller, wherein the priority notification is based on data from the at least one of the one or more client devices, and wherein the priority notification is indicative of a low latency requirement associated with the client resource; and
identify the client resource traffic for the optimized service flow, wherein identifying the client resource traffic on the optimized service flow comprises one of:
modifying one or more parameters of the optimized service flow, wherein the optimized service flow is one of one or more existing service flows;
creating a new service flow as the optimized service flow; or
selecting a low latency service flow from the one or more existing service flows on which low latency packets are currently routed as the optimized service flow based on an usage factor associated with the low latency service flow.

9. The network device of claim 8, wherein the processor is configured to execute one or more further instructions to:
receive an action message from the at least one of the one or more client devices, wherein the action message is based on the data from the at least one of the one or more client devices;
send the action message to the low latency controller using an existing service flow of the one or more existing service flows; and
wherein the priority notification is based on the action message.

10. The network device of claim 9, wherein the processor is configured to execute one or more further instructions to:
receive, from the low latency controller, a client resource message associated with the client resource, wherein the client resource message is based on the action message; and
route the client resource message to the client resource over the optimized service flow.

11. The network device of claim 10, wherein:
the client resource is an Internet of Things (IoT) device;
a local IoT controller is connected between the network device and the client resource; and
the routing the client resource message to the client resource comprises routing the client resource message to the local IoT controller.

12. The network device of claim 8, wherein identifying the client resource traffic on the optimized service flow comprises selecting the low latency service flow, and wherein selecting the low latency service flow comprises:
determining one or more traffic class attributes associated with the low latency service flow;
selecting a traffic class associated with the low latency service flow based on the one or more traffic class attributes;
determining a usage factor associated with the low latency service flow; and
routing the client resource traffic to the low latency service flow based on the traffic class and the usage factor.

13. The network device of claim 8, wherein the priority notification is also indicative of a low latency requirement associated with the at least one of the one or more client devices such that client device traffic associated with the at least one of the one or more client devices is also identified for the optimized service flow.

14. The network device of claim 8, wherein the processor is configured to execute one or more further instructions to:
determine a cessation of client device traffic associated with the at least one of the one or more client devices; and
alter the optimized service flow based on the cessation of the client device traffic, wherein altering the optimized service flow comprises one of:
reverting the modification of the one or more parameters;
deleting the new service flow; or
ceasing routing of the client resource traffic on the optimized service flow.

15. A non-transitory computer-readable medium storing one or more instructions for identifying client resource traffic associated with a client resource for an optimized service flow, which when executed by a processor of a network device, cause the network device to perform one or more operations to:
establish a connection to a low latency controller and one or more client devices, wherein the client resource is associated with at least one of the one or more client devices;
receive a priority notification associated with the client resource from the low latency controller, wherein the priority notification is based on data from the at least one of the one or more client devices, and wherein the priority notification is indicative of a low latency requirement associated with the client resource; and
identify the client resource traffic for the optimized service flow, wherein identifying the client resource traffic on the optimized service flow comprises one of:
modifying one or more parameters of the optimized service flow, wherein the optimized service flow is one of one or more existing service flows;
creating a new service flow as the optimized service flow; or
selecting a low latency service flow from the one or more existing service flows on which low latency packets are currently routed as the optimized service flow based on an usage factor associated with the low latency service flow.

16. The non-transitory computer-readable medium of claim 15, wherein the one or more instructions when further executed by the processor cause the network device to further perform the one or more operations to:
receive an action message from the at least one of the one or more client devices, wherein the action message is based on the data from the at least one of the one or more client devices;
send the action message to the low latency controller using an existing service flow of the one or more existing service flows; and
wherein the priority notification is based on the action message.

17. The non-transitory computer-readable medium of claim 16, wherein the one or more instructions when further executed by the processor cause the network device to further perform the one or more operations to:
- receive, from the low latency controller, a client resource message associated with the client resource, wherein the client resource message is based on the action message; and
- route the client resource message to the client resource over the optimized service flow.

18. The non-transitory computer-readable medium of claim 17, wherein:
- the client resource is an Internet of Things (IoT) device;
- a local IoT controller is connected between the network device and the client resource; and
- the routing the client resource message to the client resource comprises routing the client resource message to the local IoT controller.

19. The non-transitory computer-readable medium of claim 15, wherein the priority notification is also indicative of a low latency requirement associated with the at least one of the one or more client devices such that client device traffic associated with the at least one of the one or more client devices is also identified for the optimized service flow.

20. The non-transitory computer-readable medium of claim 15, wherein the one or more instructions when further executed by the processor cause the network device to further perform the one or more operations to:
- determine a cessation of client device traffic associated with the at least one of the one or more client devices; and
- alter the optimized service flow based on the cessation of the client device traffic, wherein altering the optimized service flow comprises one of:
- reverting the modification of the one or more parameters;
- deleting the new service flow; or
- ceasing routing of the client resource traffic on the optimized service flow.

* * * * *